A. L. RIKER.
WIND SHIELD.
APPLICATION FILED MAR. 6, 1916.
1,275,173.
Patented Aug. 6, 1918.
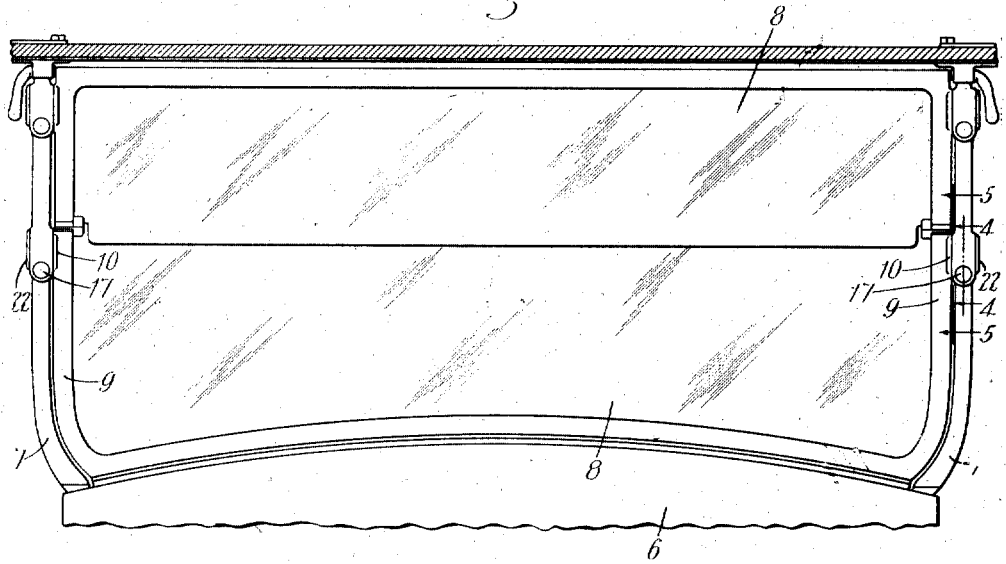
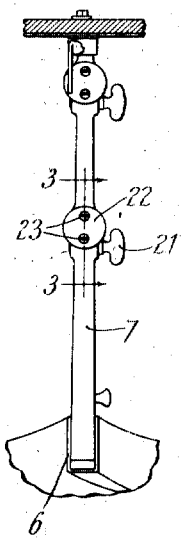
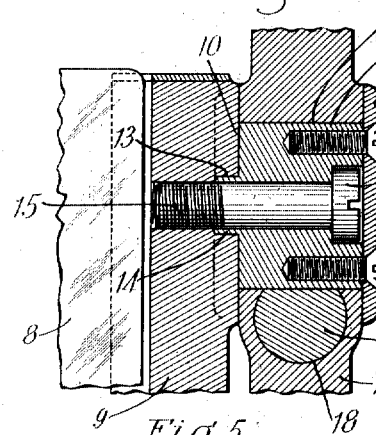
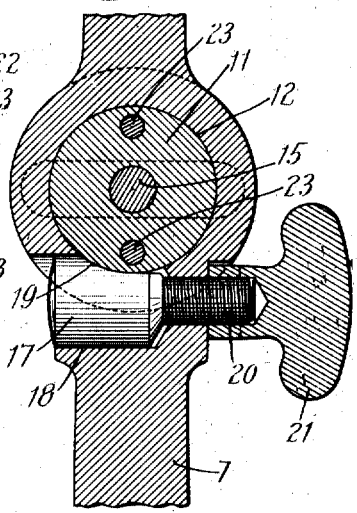
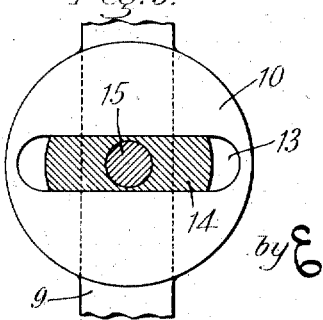
Inventor:
Andrew L. Riker.
by Emery, Booth, Janney & Varney.
Attys.

UNITED STATES PATENT OFFICE.

ANDREW L. RIKER, OF BRIDGEPORT, CONNECTICUT, ASSIGNOR TO THE LOCOMOBILE COMPANY OF AMERICA, OF BRIDGEPORT, CONNECTICUT, A CORPORATION OF WEST VIRGINIA.

WIND-SHIELD.

1,275,173. Specification of Letters Patent. Patented Aug. 6, 1918.

Application filed March 6, 1916. Serial No. 82,294.

*To all whom it may concern:*

Be it known that I, ANDREW L. RIKER, a citizen of the United States, and a resident of Bridgeport, in the county of Fairfield and State of Connecticut, have invented an Improvement in Wind-Shields, of which the following description, in connection with the accompanying drawings, is a specification, like characters on the drawings representing like parts.

This invention relates to improvements in wind shields for motor vehicles, and is more particularly concerned with a pivotal mounting for an adjustable glass.

My invention will be best understood by reference to the following description, when taken in connection with the accompanying drawings showing one illustrative embodiment thereof, while its scope will be more particularly pointed out in the appended claims.

In the drawings:

Figure 1 is an elevation of one face of a wind shield embodying my invention, as well as a portion of the vehicle upon which it is mounted;

Fig. 2 is an elevation of one edge of the same;

Fig. 3 is a detail sectional view on line 3—3 of Fig. 2;

Fig. 4 is a detail sectional view on line 4—4 of Fig. 1; and

Fig. 5 is a detail sectional view on line 5—5 of Fig. 1.

Referring to the drawings, and to the embodiment of my invention which I have selected for illustration, I have there shown a suitable support 6, which may be and in the present instance is the cowl, or dash, forming a part of the front portion of the body of a motor or other vehicle. Secured to and outwardly projecting from the cowl 6 is a pair of standards or stanchions 7, 7, constituting supports for the wind shield proper, the latter comprising one or more, herein upper and lower, glass shields 8, 8. The upper and lower panes of glass may be mounted in suitable sashes or frames, and the latter may be, and in the present instance are, mounted upon the standards or stanchions by use of identical mountings. A description of the mounting for the lower glass will suffice for both.

The lower glass 8 is mounted in a frame or sash 9, which may be of any suitable construction to receive the glass, and is herein provided with bosses 10 for its attachment to the standards or stanchions. The glass shield 8 is provided with pivotal bearings, herein comprising a pair of axially alined members 11, secured to the frame 9 and extending into the standards or stanchions 7, respectively, the latter having provision for the removal of said members endwise from said standards, this result being herein obtained by providing each standard with an opening 12 extending entirely through the standard from side to side. This opening in each standard receives the member 11, which constitutes a trunnion journaled therein. Each trunnion may be secured to the frame 9 in any appropriate manner, and in the present instance the boss 10 is provided with a recess 13 to receive a projection 14 in the form of a tongue formed on the trunnion member 11, and interengaging with the frame in such a manner that relative turning movement of one upon the other is impossible, this being accomplished in the present instance by making the recess 13 in the form of an elongated groove, into which the tongue 14 snugly fits.

The trunnion member 11 may be secured to the frame 9 by suitable fastening means, herein a screw 15 extending axially through the trunnion member, and threaded into the boss 10 of the frame, the screw having a head 16 which is accessible from the outer face of the standard or stanchion, whereby, by the simple removal of the screws on both sides, the trunnions may be withdrawn endwise through the stanchions, and the glass with its frame removed from its place between the stanchions, without disturbing the latter, this being a great advantage in assembling the parts, as well as in renewing a glass should it become broken. This construction, moreover, makes an exceedingly strong yet simple mounting, in which the screw does nothing but simply hold the trunnion in position, without taking any of the strain, except to act as a fastening for the trunnion. The latter, it will be observed, is positively interlocked with the frame, so that any turning stress on one is directly transmitted to the other. Thus it will be evident that, by securing the trunnion member 11 in fixed position, the frame 9 and glass 8 supported thereby will be securely held against turning movement, without any stress upon the screw 16.

As a means for securing the trunnion member and holding the glass in any desired position of angular adjustment, I have herein provided for each trunnion member a clamping member 17 having a wedge-like clamping action against the periphery of the trunnion member, the clamping action being secured by moving the member 17 in general direction tangentially with respect to the trunnion member. In the present instance, the standard or stanchion 7 is provided with a cylindrical recess 18 to receive the clamping member 17, which is of corresponding cylindrical form. The latter is provided with a cut-away portion 19, constituting a wedge-like surface engaging the circumferential surface of the trunnion member 11 while the clamping member is provided with a threaded stem 20 on which is threaded a suitable thumb-nut 21. By turning the latter in the proper direction, the surface 19 may be drawn with such force against the circumferential surface of the trunnion member as to bind the latter so tightly as to prevent turning movement, but by simply loosening the nut slightly, the glass may be adjusted to the desired angle, and instantly secured in the desired position of adjustment by tightening the nut.

It should be observed that the clamping device in no way interferes with the endwise removal of the trunnion member, except of course that the clamping device must be slackened to allow the trunnion member to be withdrawn axially. If desired, the opening 12 may be normally covered by a removable cover 22, which serves to exclude moisture and dust from the joint, as well as to present a neat appearance. This plate may be secured in place in any suitable manner, as by means of a pair of screws 23 passing through suitable perforations in the plate and threaded into the trunnion member 11. It requires simply the removal of these screws to take off the plate, and thus render the pivotal mounting of the glass accessible and instantly removable without disturbing the standards or stanchions, while each of the latter may be made in one piece, and consequently more rigid and of lighter construction than is possible with other designs.

While I have herein shown and described one form of my invention for illustrative purposes, and have disclosed and discussed in detail the construction and arrangement incidental to one specific application thereof, it is to be understood that the invention is limited neither to the mere details or relative arrangement of parts, nor to its specific application herein shown, but that extensive deviations from the illustrated form or embodiment of the invention may be made, without departing from the principles thereof.

Having thus described one form of my invention, what I claim and desire by Letters Patent to obtain is:

1. A windshield comprising, in combination, a pair of standards, a shield interposed between and supported by said standards, and pivotal bearings for said shield comprising a pair of axially alined members secured to said shield and extending into said standards, respectively, the latter having provision for the removal of said members endwise through the outer sides of said standards and having provision for the subsequent removal of said shield without disturbing said standards.

2. A windshield comprising, in combination, a pair of stanchions, a shield interposed between and supported by said stanchions, pivotal bearings for said shield comprising a pair of axially alined trunnion members swiveled in said stanchions, respectively, and means to secure said trunnion members to said shield, said stanchions having provision for the removal of said means endwise through the outer sides of said stanchions and having provision for the subsequent removal of said shield without disturbing said stanchions.

3. A windshield comprising, in combination a pair of stanchions provided with axially alined openings, a shield interposed between and supported by said stanchions, pivotal bearings for said shield comprising a pair of trunnion members located in said openings, respectively, and means distinct from said trunnion members to secure said trunnion members to said shield, said means being accessible through the outer sides of said openings.

4. A windshield comprising, in combination, a pair of stanchions provided with axially alined openings, a shield interposed between and supported by said stanchions, pivotal bearings for said shield comprising a pair of trunnion members located in said openings, respectively, and means distinct from said trunnion members to secure said trunnion members to said shield, said means being accessible through the outer sides of openings and said trunnion members being withdrawable through the outer sides of said openings.

5. A windshield comprising, in combination, a pair of stanchions provided with axially alined openings, a shield interposed between and supported by said stanchions, pivotal bearings for said shield comprising a pair of trunnion members located in said openings, respectively, means to secure said trunnion members to said shield, said means being accessible through the outer sides of said openings, and removable cover plates for the outer sides of said openings, respectively.

6. A windshield comprising, in combination, a pair of stanchions, a shield interposed between and supported by said stanchions, pivotal bearings for said shield comprising a pair of axially alined trunnion members swiveled in said stanchions, respectively, and having interlocking engagement with said shield, and means to secure said trunnion members to said shield, said stanchions having provision for the removal of said means endwise through the outer sides of said stanchions.

7. A windshield comprising, in combination, a pair of stanchions, a shield interposed between and supported by said stanchions, pivotal bearings for said shield comprising a pair of axially alined trunnion members swiveled in said stanchions, respectively, said shield being provided with recesses, and said trunnion members being provided with projections engaging said recesses and held against turning movement thereby, and means to secure said trunnion members to said shield, said stanchions having provision for the removal of said means endwise through the outer sides of said stanchions.

8. A windshield comprising, in combination, a pair of stanchions, a shield interposed between and supported by said stanchions, pivotal bearings for said shield comprising a pair of axially alined trunnion members swiveled in said stanchions, respectively, means engaging the peripheries of said trunnion members to hold them against turning movement, and means to secure said trunnion members to said shield, said stanchions having provision for the removal of said means endwise through the outer sides of said stanchions.

9. A windshield comprising, in combination, a pair of stanchions provided each with a trunnion bearing and a cylindrical bore of two diameters, the larger intersecting said bearing; a shield interposed between said stanchions, pivotal bearings for said shield comprising a pair of axially alined trunnion members swiveled in said stanchions and secured to said shield, and means engaging the peripheries of said trunnion members to hold them against turning movement, said means each comprising a cylindrical clamping member provided with a head fitting the larger diameter of said cylindrical bore and having a cut-away portion constituting a wedge-like surface engaging the circumferential surface of the trunnion member, said clamping member being provided with a reduced threaded stem fitting the smaller diameter of said cylindrical bore, and a nut threaded onto said stem.

In testimony whereof, I have signed my name to this specification, in the presence of two subscribing witnesses.

ANDREW L. RIKER.

Witnesses:
B. J. CONNOLLY.
F. E. LYTLE.